(12) United States Patent
Burks et al.

(10) Patent No.: US 10,208,243 B2
(45) Date of Patent: Feb. 19, 2019

(54) LOW-ENERGY PROPPANTS FOR DOWNHOLE OPERATIONS

(71) Applicant: Halliburton Energy Services, Inc., Houston, TX (US)

(72) Inventors: Jody Marie Burks, Spring, TX (US); Ali Alwattari, The Woodlands, TX (US); Tatyana V Khamatnurova, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/544,242

(22) PCT Filed: Mar. 12, 2015

(86) PCT No.: PCT/US2015/020189
§ 371 (c)(1),
(2) Date: Jul. 17, 2017

(87) PCT Pub. No.: WO2016/144361
PCT Pub. Date: Sep. 15, 2016

(65) Prior Publication Data
US 2017/0369769 A1    Dec. 28, 2017

(51) Int. Cl.
| | | |
|---|---|---|
| *E21B 43/26* | (2006.01) | |
| *C09K 8/80* | (2006.01) | |
| *C09K 8/60* | (2006.01) | |
| *C09K 8/68* | (2006.01) | |
| *C09K 8/86* | (2006.01) | |
| *E21B 43/267* | (2006.01) | |

(52) U.S. Cl.
CPC .............. *C09K 8/805* (2013.01); *C09K 8/602* (2013.01); *C09K 8/68* (2013.01); *C09K 8/80* (2013.01); *C09K 8/86* (2013.01); *E21B 43/26* (2013.01); *E21B 43/267* (2013.01)

(58) Field of Classification Search
CPC .......... C09K 8/805; C09K 8/602; C09K 8/80; E21B 43/26
USPC ....................................... 166/280.2
See application file for complete search history.

(56) References Cited

U.S. PATENT DOCUMENTS

| | | | | |
|---|---|---|---|---|
| 4,018,689 | A * | 4/1977 | Thompson | ............... C09K 8/62 166/307 |
| 4,126,181 | A * | 11/1978 | Black | ................... B01F 3/04992 166/177.5 |
| 7,216,711 | B2 | 5/2007 | Nguyen et al. | |
| 8,584,754 | B1 | 11/2013 | Nguyen et al. | |
| 2009/0221454 | A1 | 9/2009 | Welton et al. | |
| 2012/0279704 | A1* | 11/2012 | Eoff | ...................... C09K 8/5751 166/280.2 |

(Continued)

FOREIGN PATENT DOCUMENTS

| | | |
|---|---|---|
| WO | 2011018688 A2 | 2/2011 |
| WO | 2013158306 A1 | 10/2013 |
| WO | 2013158308 A1 | 10/2013 |

*Primary Examiner* — Silvana C Runyan
(74) *Attorney, Agent, or Firm* — McAfee & Taft

(57) ABSTRACT

This present application relates generally to enhancing flow of fluids during fracturing operations. More specifically, the application relates to providing a proppant with a low surface energy, introducing the proppant into a subterranean formation with a surfactant selected to interact with the proppant such that the recovery of hydrocarbons from the subterranean formation is enhanced.

12 Claims, 2 Drawing Sheets

(56) References Cited

U.S. PATENT DOCUMENTS

2014/0190700 A1 7/2014 Tang et al.

* cited by examiner

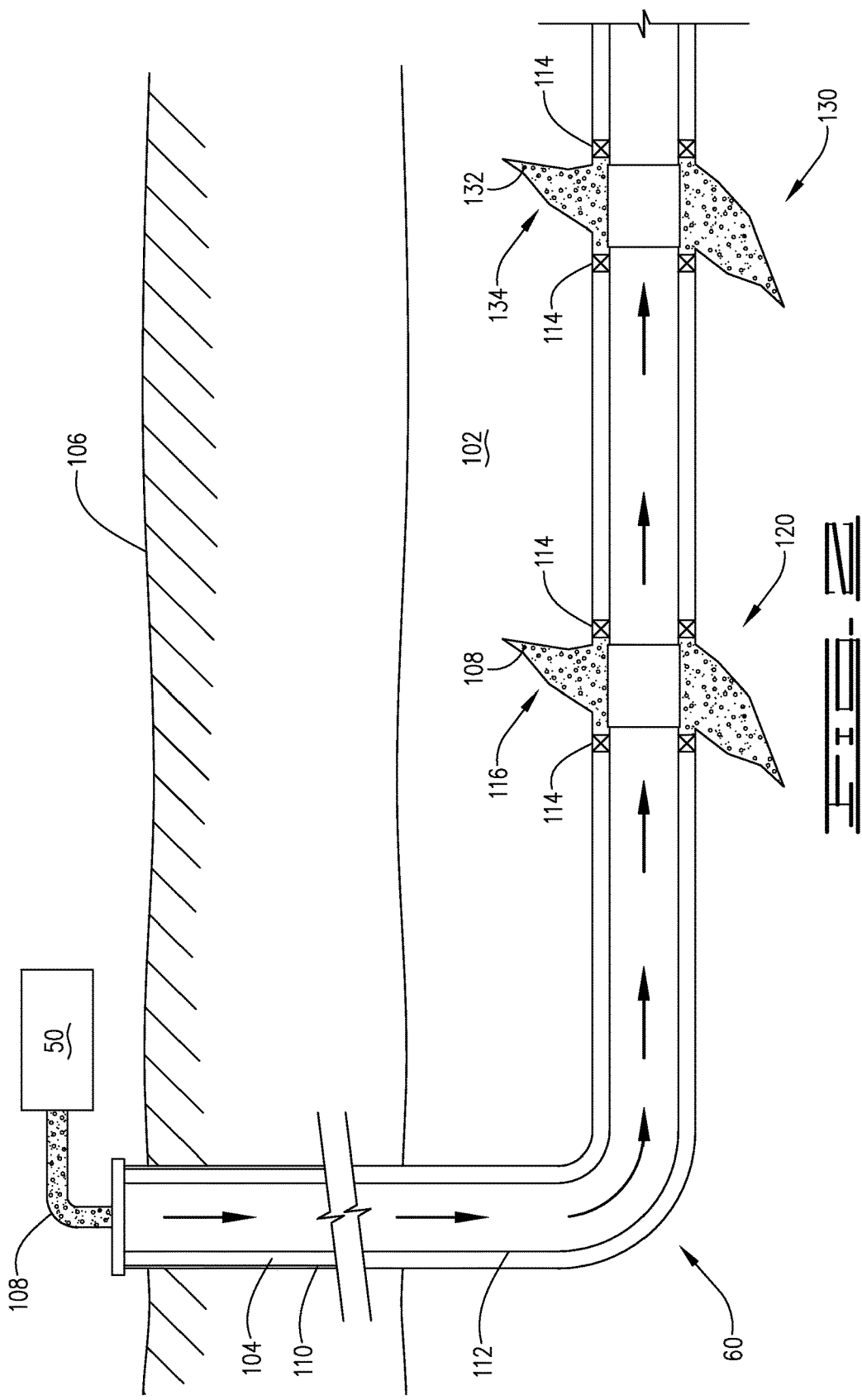

LOW-ENERGY PROPPANTS FOR DOWNHOLE OPERATIONS

FIELD OF INVENTION

This present application relates generally to systems and methods for fracturing technologies.

BACKGROUND

To produce oil or gas from a reservoir, a well is drilled into a subterranean formation, which may be the reservoir or adjacent to the reservoir. A well includes a wellhead and at least one wellbore from the wellhead penetrating the earth. Typically, a wellbore must be drilled thousands of feet into the earth to reach a hydrocarbon-bearing formation. Generally, as the depth of the formation increases, the static pressure and temperature of the formation increases.

After a wellbore is drilled, it may often be necessary to fracture the subterranean formation to enhance hydrocarbon production, especially in tight formations like shales and tight-gas sands. Access to the subterranean formation can be achieved by first creating an access conduit from the wellbore to the subterranean formation. Then, a fracturing fluid is introduced at pressures exceeding those required to maintain matrix flow in the formation permeability to create or enhance at least one fracture that propagates from at least one access conduit. The fracturing fluid is followed by a treatment fluid comprising a proppant particle to prop the fracture open after pressure from the fluid is reduced.

As used herein, "proppant particles" and "proppants" may be interchangeable and refer to any material or formulation that can be used to hold open at least a portion of a fracture. It should be understood that the term "particulate" or "particle," and derivatives thereof as used in this disclosure, includes all known shapes of materials, including substantially spherical materials, low to high aspect ratio materials, fibrous materials, polygonal materials (such as cubic materials), and mixtures thereof.

BRIEF DESCRIPTION OF THE FIGURES

FIG. 2 is a diagram illustrating an example of a subterranean formation in which a fracturing operation may be performed in accordance with certain embodiments of the present disclosure.

DETAILED DESCRIPTION

Figure 1:
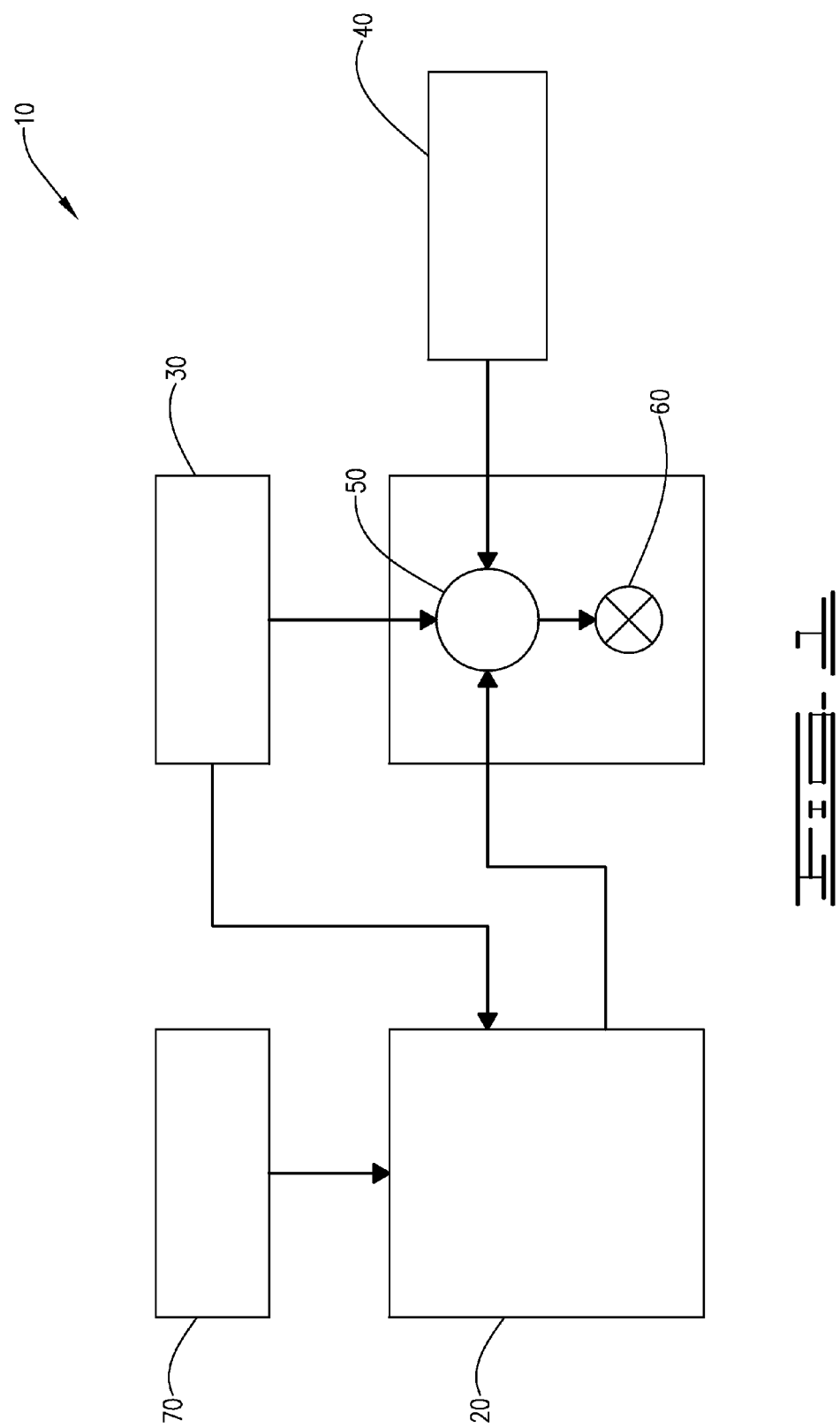
FIG. 1 is a diagram illustrating an example of a fracturing system that may be used in accordance with certain embodiments of the present disclosure.

The present disclosure may be understood more readily by reference to the following detailed descriptions as well as to the examples included therein. For simplicity and clarity of illustration, where appropriate, reference numerals have been repeated among the different figures to indicate corresponding or analogous elements. In addition, numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Flow of fluids through a defined space, such as fracturing fluids and treatment fluids in subterranean formations, can be enhanced through the methods and compositions disclosed herein.

Relative changes in the surface energy of solid surfaces, including proppant surfaces, can change solid surface interaction with liquids, and thus, transform flow behavior of the liquids around the solid surface. The surface energy of a solid is defined as the sum of all intermolecular forces on the surface of a material. The surface energy is the degree of attraction or repulsion force that a material surface exerts on another material. This same definition applies to the surface tension of a liquid. Surface tension is the resistance of a fluid to deform or break. In this context, the resistance is intermolecular forces exerted on the liquid surface. Thus, undisturbed liquid strives to a shape that minimizes its surface area.

Solids used for proppants, such as silicates, metals, glasses, and ceramics, are typically high-energy solids because the chemical bonds that hold them together (e.g., covalent, ionic, or metallic) are very strong. Thus, it takes a large input of energy to break these bonds, so they are termed "high-energy". High-energy proppants can have a surface energy greater than 100 $mJ/m^2$ (Dyn/cm), 200 $mJ/m^2$ (Dyn/cm), 300 $mJ/m^2$ (Dyn/cm) and even reaching up to 4000 $mJ/m^2$ (Dyn/cm) or more. Thus, the surface energy of high-energy proppants may range from about 100 $mJ/m^2$ (Dyn/cm) to about 4000 $mJ/m^2$ (Dyn/cm). More typically the surface energy of high-energy proppants range from about 100 $mJ/m^2$ (Dyn/cm) to about 500 $mJ/m^2$ (Dyn/cm).

On the other hand, low-energy solids have weak molecular structures (e.g., fluorocarbons, hydrocarbons, etc.) because physical forces (e.g., van der Waals and hydrogen bonds) hold them together. A low input of energy is required to break these types of physical forces, thus the term "low-energy." Low-energy proppants tend to have a surface energy less than 60 $mJ/m^2$ (Dyn/cm), 50 $mJ/m^2$ (Dyn/cm), 40 $mJ/m^2$ (Dyn/cm) and even as low as 20 $mJ/m^2$ (Dyn/cm) or less.

Typically, proppant particles have a high surface energy in order to withstand the pressure of the subterranean formation. Unfortunately, high surface energy proppants increase the drag resistance on the flow of hydrocarbon (e.g. crude oil) and the flowback of other fluids. The methods and compositions herein include a proppant particle in combination with a treatment fluid, where the proppant has a surface energy less than the surface tension of the treatment fluid while still maintaining sufficient strength to withstand subterranean formation pressure.

As described herein, a proppant particle may have low surface energy due to the makeup of the proppant particle itself, through methods of coating the proppant particle with a low-surface-energy material, by wetting the proppant particle with a low-surface-energy surfactant, or by some other way.

For example, the proppant particle itself may be made of a polymer such as polytetrafluoroethylene material. Polymer materials used as proppants have a relatively low surface energy, ranging anywhere from 20 $mJ/m^2$ (Dyn/cm) to 50 $mJ/m^2$ (Dyn/cm). Other low-energy materials used as proppants can have a surface energy less than 59 $mJ/m^2$ (Dyn/cm). Although polymer proppant particles have relatively low crush strength and may not be suitable for all downhole operations, they may be suitable for some. Moreover, they are provided only for example and should not limit the disclosure to only polymer proppant particles.

The proppant particle may be coated with a low-surface-energy material in order to exhibit low surface energy behaviors. As discussed above, generally, proppants are considered high-energy solids. By coating a high-energy proppant with low-surface-energy material, one can alter the surface energy of the high-energy proppant while maintaining the proppants crush strength. Tailoring the surface energy of a high-energy proppant material to the desired surface energy can dramatically improve flow behaviour of hydrocarbons past the proppant material, thereby, increasing hydrocarbon production in subterranean formations.

In some embodiments, the high-energy proppant may simply be coated with a low-energy material having a surface energy less than the surface tension of the selected treatment fluid to interact with the coated low-energy proppant. In other embodiments, the selected treatment fluid can have a surface tension greater than the surface energy of the coated low-energy proppant by at least about 5 mJ/m$^2$ (Dyn/cm), about 10 mJ/m$^2$ (Dyn/cm), about 15 mJ/m$^2$ (Dyn/cm) or 20 mJ/m$^2$ (Dyn/cm).

In other embodiments, the low-energy material for coating the proppant can have a surface energy equal to or less than 59 mJ/m$^2$ (Dyn/cm). In other embodiments, the surface energy is in the range from about 10 mJ/m$^2$ (Dyn/cm) to about 47 mJ/m$^2$ (Dyn/cm) or more preferably in the range from about 15 mJ/m$^2$ (Dyn/cm) to about 38 mJ/m$^2$ (Dyn/cm).

Coating the proppant particle may include the following coating technologies: micro- and nano-pattering or plating, spraying or fluid bed techniques for film deposition. Such coating methods create a coated film on the proppant particle to alter the contact angle (surface energy) parameters of that particle. One may use batch coatings, continuous coatings or discontinuous coatings (e.g. dot matrix for waxes, fats & polymers). Depending on the coating method, a layer as thick as 10 millimeters to as thin as 1 nanometer may be employed.

Other methods of coating the proppant may incorporate a 100% concentration of the coating material to be introduced to the proppant (e.g. melt coats). Others may incorporate less than 100% concentration of the coating material to be applied to the proppant. Still others may involve liquid applications followed by setting and/or drying. A common method for coating proppant is to spray a mist of the coating material using high-pressure sprayers while rotating the proppant. Another common method includes melt spinning where the coating material is melted, stretched and dropped onto a cooling belt covered with proppant. The means and methods of coating a proppant are not limited to those described, and should include all those known to those of ordinary skill in the art.

Suitable low-energy materials used for coating include, but are not limited to, Polydimethylsiloxane PDMS, Polytetrafluoroethylene PTFE, Polytrifluoroethylene P3FEt/PTrFE, Polyhexylmethacrylate PHMA, Polypropylene-isotactic PP, Polyvinylidene fluoride PVDF, Poly(t-butylmethacrylate) PtBMA, Polychlorotrifluoroethylene PCTrFE, Polyisobutylmethacrylate PIBMA, Polybutylmethacrylate PBMA, Polytetramethylene oxide PTME (Polytetrahydrofurane PTHF), Polyisobutylene PIB, Polycarbonate PC, Polyethylene-branched PE, Polyethylene-linear PE, Polyethylmethacrylate PEMA, Polyvinylacetate PVA, Polyvinyl fluoride PVF, Polyethylacrylate PEA, Poly-a-methyl styrene PMS (Polyvinyltoluene PVT), Polystyrene PS, Polyamide-12 PA-12, Polymethylacrylate (Polymethacrylic acid) PMAA, Polymethylmethacrylate PMMA, Polyvinylchloride PVC, Polyetheretherketone PEEK, Polyethyleneoxide PEO, Polyethyleneterephthalate PET, Polyvinylidene chloride PVDC, and Polyamide-6,6 PA-66.

Other low-energy material used for coating may include: animal-plant- or petroleum-derived waxes including but are not limited to functionalized paraffin wax, microcrystalline wax, polyethylene and other polyolefins; superhydrophobic films such as perfluorinated alkyltrialkoxysilanes, perfluorinated polyethylenes, polytetrafluorinated polyethylenes, alkylated polystyrenes, alkylated polyesters, alkylated polyamides, polyisobutylene; esters of fatty acids including but not limited to palmitate, palmitoleate, oleate esters, fatty alcohols, pharmaceutical tablet coatings, biological coatings such as membranes, proteins, amino acids, peptides, hydrophobically-funtionalized nucleic acids, modified glycosylated proteins, porous polymer coatings, sucrose ester fatty acids (fatty sugars), oligomers (short chain polymers or parts of polymers), thiol-ene-, epoxy-organosilicon-, acrylic-, phenolic-, or polyurethane-based resins, composite materials comprising of film-forming polymer matrices and a filler including but are not limited to strength reinforced materials, surfactants, gelling materials, CNT, mica powder, titanium carbonate, titanium oxide.

The proppant particle may be wetted with a low-surface-energy surfactant in order to exhibit low surface energy behaviors. Surface wettability or wetting is defined herein as the ability of a liquid to maintain contact with a solid surface, resulting from intermolecular interactions when the two are brought together. At the liquid-solid surface interface, if the molecules of the liquid have a stronger attraction to the molecules of the solid surface than to each other (the adhesive forces are stronger than the cohesive forces), "wetting" of the surface occurs. Alternately, if the liquid molecules are more strongly attracted to each other than the molecules of the solid surface (the cohesive forces are stronger than the adhesive forces), the liquid beads-up and does not wet the surface of the solid.

As defined herein, preferential wetting occurs when a liquid has a higher probability of wetting a first solid surface than a second solid surface; that is, the liquid preferentially wets the first solid surface. Generally, this can occur when the first solid has a higher surface energy than the second solid. Preferential wetting is more pronounced when the first solid has a higher surface energy than the surface tension of the liquid and the second solid has a lower surface energy than the surface tension of the liquid.

In some embodiments, the high-energy proppant may simply be wetted with a low-energy surfactant having a surface tension less than the surface tension of the treatment fluid selected to interact with the wetted low-energy proppant. In other embodiments, the selected treatment fluid can have a surface tension greater than the surface energy of the wetted low-energy proppant by at least about 5 mJ/m$^2$ (Dyn/cm), about 10 mJ/m$^2$ (Dyn/cm), about 15 mJ/m$^2$ (Dyn/cm) or 20 mJ/m$^2$ (Dyn/cm).

In still other embodiments, the low-energy surfactant for wetting the proppant can have a surface tension equal to or less than 59 mJ/m$^2$ (Dyn/cm). In other embodiments, the surface tension is in the range from about 10 mJ/m$^2$ (Dyn/cm) to about 47 mJ/m$^2$ (Dyn/cm) or more preferably in the range from about 15 mJ/m$^2$ (Dyn/cm) to about 38 mJ/m$^2$ (Dyn/cm).

Low-energy surfactants used for wetting a high-surface-energy proppant particle may include amphoteric surfactants. An example of commercially available surfactants used for wetting high surface energy proppant particle may include Fomblin™ Y marketed by Solvay.

As herein included, when referring to surface energy or surface tension, both are measured in forces per unit length. Both are commonly found measured in the SI units of millijoule per meter squared (mJ/m$^2$), millinewton per meter (mN/m) and in the CGS unit of dyne per centimeter (Dyn/cm). As reflected herein, the surface tension and surface energy are shown in both the SI unit of millijoule per meter squared (mJ/m$^2$) and the CGS unit of dyne per centimeter (Dyn/cm). The surface energy and surface tension measurements provided herein are measured at 20° C.

Whether high-energy or low-energy, the mean proppant size generally may range from about 2 mesh to about 400 mesh on the U.S. Sieve Series; however, in certain circumstances, other mean proppant sizes may be desired and will be entirely suitable for practice of the present invention. In particular, embodiments, preferred mean proppant size distribution ranges are one or more of 6/12, 8/16, 12/20, 16/30, 20/40, 30/50, 40/60, 40/70, or 50/70 mesh. In certain embodiments, the proppants may be present in the fracturing fluids of the present invention in an amount in the range of from about 0.1 pounds per gallon ("ppg") to about 30 ppg by volume of the fracturing fluid, preferably from about 0.5 ppg to about 15 ppg, and more preferably from about 1.0 ppg to 10 ppg.

As described herein, aqueous fluid or aqueous base fluid (fracture and/or first and/or second) may be used interchangeably and include fresh water, salt water, brine, formation brine, seawater, or any other aqueous fluid that, preferably, does not adversely interact with the other components used in accordance with this invention or with the subterranean formation. The aqueous base fluid may be used in combination with a treatment fluid, a fracturing fluid or a combination thereof.

The exemplary methods and compositions disclosed herein may directly or indirectly affect one or more components or pieces of equipment associated with the preparation, delivery, recapture, recycling, reuse, and/or disposal of the disclosed compositions.

For example, and with reference to FIG. 1, the disclosed apparatuses, methods and compositions may directly or indirectly affect one or more components or pieces of equipment associated with an exemplary fracturing system 10, according to one or more embodiments. In certain instances, system 10 includes a treatment fluid producing apparatus 20, a fluid source 30, a proppant source 40, and a pump and blender system 50 and resides at the surface of a well site where a well 60 is located. In certain instances, treatment fluid producing apparatus 20 combines with an aqueous fluid (e.g., liquid or substantially liquid) from fluid source 30, to produce a fracturing fluid that is used to fracture the formation. The system may also include additive source 70 that provides one or more additives (e.g., gelling agents, weighting agents, and/or other optional additives) to alter the properties of the fracturing fluid. In other instances, treatment fluid producing apparatus 20 combines with an aqueous fluid (e.g., liquid or substantially liquid) from fluid source 30, to produce a treatment fluid that is used for some other downhole operation such as drilling, completion or intervention operations. As described in FIG. 1, pump and blender system 50 receives the fracture fluid/treatment fluid and combines it with other components. The components can include a high-energy proppant, or a low-energy proppant as described herein, from proppant source 40. The resulting mixture can then be pumped down well 60 for fracturing or some other downhole operation.

In some embodiments disclosed herein, the low-energy proppant from proppant source 40 may itself be composed of a material having a surface energy less than the surface tension of the fracturing fluid. In other embodiments, the low-energy proppant provided by proppant source 40 may comprise proppant particles at least partially coated with a low-energy material described above. In still other embodiments, the low-energy proppant particles provided by proppant source 40 may be wetted with a low-energy surfactant as described above. The above-mentioned embodiments provide improved flow of hydrocarbon (e.g. crude oil) and flowback of other fluids through well 60 due to the reduced drag resistance exerted by the low-energy proppant on the formation hydrocarbon and other fluids.

FIG. 2 shows well 60 during a fracturing operation in a portion of a subterranean formation of interest 102 surrounding a well bore 104. Well bore 104 extends from a surface 106, and a treatment fluid 108, 132 is applied to a portion of the subterranean formation 102 surrounding the horizontal portion of the well bore. Treatment fluid 108, 132 can be a fracturing fluid or a treatment fluid introduced into the subterranean formation 102 after the fracturing fluid. Although shown as vertical deviating to horizontal, well bore 104 may include horizontal, vertical, slant, curved, and other types of well bore geometries and orientations, and the fracturing treatment may be applied to a subterranean zone surrounding any portion of the well bore. Well bore 104 can include a casing 110 that is cemented or otherwise secured to the well bore wall. Well bore 104 can be uncased or include uncased sections. Perforations can be formed in casing 110 to allow treatment fluids to flow into subterranean formation 102. In cased wells, perforations can be formed using shape charges, a perforating gun, hydro-jetting and/or other tools.

Well 60 is shown with a work string 112 descending from surface 106 into well bore 104. Pump and blender system 50 couples with work string 112 to pump treatment fluid 108, 132 into well bore 104. Work string 112 may include coiled tubing, jointed pipe, and/or other structures that allow fluid to flow into well bore 104. Work string 112 can include flow control devices, bypass valves, ports, and or other tools or well devices that control a flow of fluid from the interior of work string 112 into subterranean zone 102. For example, work string 112 may include ports adjacent the well bore wall to communicate treatment fluid 108, 132 directly into subterranean formation 102. Work string 112 may include ports that are spaced apart from the well bore wall to communicate treatment fluid 108, 132 into an annulus in well bore 104 between work string 112 and the well bore wall.

Work string 112 and/or well bore 104 may include one or more sets of packers 114 that seal the annulus between work string 112 and well bore 104 to define an interval of well bore 104 into which treatment fluid 108, 132 will be pumped. For example purposes only, FIG. 2 shows two packers 114, one defining an up-hole boundary of the interval and one defining the down-hole end of the interval. Other embodiments may use a greater or lesser number of packers. When treatment fluid 108, 132 (as a fracture fluid) is introduced into well bore 104 (e.g., in FIG. 2, the area of well bore 104 between packers 114) at a sufficient hydraulic pressure, one or more fractures 116 may be created in subterranean formation 102 of a first zone 120 and one or more fractures 134 may be created in a second zone 130.

Once fractures 116, 134 are created, treatment fluid 108, 132 (as a treatment fluid) can be introduced into subterranean formation 102. Treatment fluid 108, 132 can comprise a low-energy proppant, an aqueous base fluid and a high-energy surfactant. The low-energy proppant particle can have low surface energy due to the makeup of the proppant particle itself, by coating the proppant, by wetting the proppant, or by some other way. A high-energy surfactant is simply defined as a surfactant having a surface tension greater than the surface energy of the low-energy proppant. Treatment fluid 108, 132 may be pumped into subterranean formation 102 by pump and blender system 50 system. The low-energy proppant in treatment fluid 108, 132 enters fractures 116, 134 where they may remain after the liquid of treatment fluid 108, 132 flows out of the well bore 104. The low-energy proppants "prop" fractures 116, 134 open so that fluids, such as hydrocarbons, will flow more freely through fractures 116, 134; moreover, the low-energy proppant in combination with the high-energy surfactant facilitates the flow of the hydrocarbons through fractures 116, 134 and around the low-energy proppant.

In another embodiment, treatment fluid 108, 132 may comprise a treatment fluid comprising a high-energy proppant and an aqueous base fluid. Treatment fluid 108, 132 may be pumped into subterranean formation 102 by pump and blender system 50 system. The high-energy proppant, in treatment fluid 108, 132, may enter fractures 116, 134 where they may remain after the liquid of treatment fluid 108, 132 flows out of the well bore 104. The high-energy proppants "prop" fractures 116, 134 open so that fluids, such as hydrocarbons, will flow more freely through fractures 116, 134. Once the high-energy proppants are deposited in the fractures 116, 134, a low-energy surfactant having a surface tension lower than the high-energy proppant's surface energy is pumped into the subterranean formation 102 to wet the high-energy proppant with a low-energy surfactant, resulting in a low-energy proppant particle. A high-energy surfactant may thereafter be pumped into the subterranean formation. The low-energy proppant in combination with the high-energy surfactant facilitates the flow of the hydrocarbons through fractures 116, 134 and around the low-energy proppant.

EXAMPLES

The following example is given to further illustrate the present disclosure, but is not intended to be limiting thereof.

The example includes testing flow behavior of a treatment fluid and liquid hydrocarbon (oil) combined with a surfactant (53.57 mJ/m$^2$ (Dyn/cm) surface tension at 1 gpt flowing through a testing tube packed with sand proppant (approx. 500 mJ/m$^2$ (Dyn/cm) surface energy) having a polypropylene interior wall (29 mJ/m$^2$ (Dyn/cm surface energy). The test revealed the oil and the treatment fluid favored flow near the polypropylene interior walls (29 mJ/m$^2$ (Dyn/cm) surface energy) and flow decreased towards the center of the sand pack proppant (approx. 500 mJ/m$^2$ (Dyn/cm) surface energy). In another example, the interior walls of the testing tube were made of glass (250-500 mJ/m$^2$ (Dyn/cm surface energy). The testing tube was packed with sand proppant (approx. 500 mJ/m$^2$ (Dyn/cm) surface energy). The test revealed the oil and the treatment fluid flowed at a similar rate near the glass interior walls (250-500 mJ/m$^2$ (Dyn/cm surface energy) and through the center of the sand proppant (approx. 500 mJ/m$^2$ (Dyn/cm) surface energy).

The results of the above-mentioned examples illustrate that the flow rate of the treatment fluid is dependent on its surface tension and the surface energy of the material through which it flows. If the treatment fluid has a surface tension greater than the surface energy of the material through which it flows, flow rate of the treatment fluid is increased over the flow rate of a treatment fluid that has a surface tension less than the surface energy of the material.

These examples illustrate, among other things, that the surface energy of the column materials makes a significant impact on flow rate. Further these examples depict that tailoring the surface energy of materials, surfactants and other additives, used in subterranean formations can facilitate the flow back of fracturing fluid, treatment fluid, and hydrocarbon flow or some combination thereof. The examples also illustrate the advantages that a low-energy proppant (or a high-energy proppant coated or wetted with a low-energy material or surfactant), in combination with a surfactant having a surface tension greater than the surface energy of the proppant. Specifically, the disclosed combination of proppant and surfactant demonstrates an increase in flow rate of fluids (including hydrocarbons) over the prior art when a low-energy proppant is used. Alternatively, the examples also illustrate the combination of proppants and surfactants can be chosen to enhance the ability to divert, restrict or inhibit fluid (including hydrocarbon) flow.

According to the description above, various embodiments will now be described. According to one set of embodiments there is provided a method comprising:
(a) providing a low-energy proppant comprising one or more particulate materials having a surface energy;
(b) producing a treatment fluid comprising the proppant and an aqueous base fluid and a high-energy surfactant, wherein the treatment fluid has a surface tension greater than the surface energy of the proppant; and
(c) introducing the treatment fluid into a subterranean formation such that a layer of the proppant particle is deposited in at least a section of a fracture in the subterranean formation.

In some aspects of the method, the high-energy surfactant can have a surface tension greater than the surface energy of the low-energy proppant by at least about 5 mJ/m$^2$ (Dyn/cm), about 10 mJ/m$^2$ (Dyn/cm), about 15 mJ/m$^2$ (Dyn/cm) or 20 mJ/m$^2$ (Dyn/cm).

In another embodiment, the method also includes providing a fracturing fluid comprising an aqueous base fluid and a fracturing surfactant; and introducing the fracturing fluid into a subterranean formation at sufficient pressure to create a fracture in the subterranean formation.

The low-energy proppant can have a surface energy equal to or less than 59 mJ/m$^2$ (Dyn/cm). The surface energy of the proppant may also be in the range from about 10 mJ/m$^2$ (Dyn/cm) to about 47 mJ/m$^2$ (Dyn/cm) and/or from about 15 mJ/m$^2$ (Dyn/cm) to about 38 mJ/m$^2$ (Dyn/cm).

The high-energy proppant can be coated with a material that has a surface energy equal to or less than 59 mJ/m$^2$ (Dyn/cm). The surface energy of the coating material may also be in the range from about 10 mJ/m$^2$ (Dyn/cm) to about 47 mJ/m$^2$ (Dyn/cm) and/or from about 15 mJ/m$^2$ (Dyn/cm) to about 38 mJ/m$^2$ (Dyn/cm).

The high-energy proppant may be wetted with a surfactant that has a surface tension equal to or less than 59 mJ/m$^2$ (Dyn/cm). The surface energy of the coating material may also be in the range from about 10 mJ/m$^2$ (Dyn/cm) to about 47 mJ/m$^2$ (Dyn/cm) and/or from about 15 mJ/m$^2$ (Dyn/cm) to about 38 mJ/m$^2$ (Dyn/cm).

The coating material can be a material selected from the following group: Polydimethylsiloxane PDMS, Polytetrafluoroethylene PTFE, Polytrifluoroethylene P3FEt/PTrFE, Polyhexylmethacrylate PHMA, Polypropylene-isotactic PP, Polyvinylidene fluoride PVDF, Poly(t-butylmethacrylate) PtBMA, Polychlorotrifluoroethylene PCTrFE, Polyisobutylmethacrylate PIBMA, Polybutylmethacrylate PBMA, Polytetramethylene oxide PTME (Polytetrahydrofurane PTHF), Polyisobutylene PIB, Polycarbonate PC, Polyethylene-branched PE, Polyethylene-linear PE, Polyethylmethacrylate PEMA, Polyvinylacetate PVA, Polyvinyl fluoride PVF, Polyethylacrylate PEA, Poly-a-methyl styrene PMS (Polyvinyltoluene PVT), Polystyrene PS, Polyamide-12 PA-12, Polymethylacrylate (Polymethacrylic acid) PMAA, Polymethylmethacrylate PMMA, Polyvinylchloride PVC, Polyetheretherketone PEEK, Polyethyleneoxide PEO, Polyethyleneterephthalate PET, Polyvinylidene chloride PVDC, and Polyamide-6,6 PA-66.

The coating material can also consist of functionalized paraffin wax, microcrystalline wax, polyethylene, polyolefins, superhydrophobic films, perfluorinated alkyltrialkoxysilanes, perfluorinated polyethylenes, polytetrafluorinated polyethylenes, alkylated polystyrenes, alkylated polyesters, alkylated polyamides, polyisobutylene, esters of fatty acids, palmitate, palmitoleate, oleate esters, fatty alcohols, membranes, proteins, amino acids, peptides, hydrophobically-funtionalized nucleic acids, modified glycosylated proteins, sucrose ester fatty acids, oligomers, thiol-ene-based resins, epoxy-based resins organosilicon-based resins, acrylic-based resins, phenolic-based resins, polyurethane-based resins, mica powder, titanium carbonate, and titanium oxide.

In another embodiment, the method includes:
(a) introducing a treatment fluid, comprising a high-energy proppant and an aqueous base fluid, into a subterranean formation;
(b) depositing a layer of the high-energy proppant particle in at least a section of a fracture in the subterranean formation;
(c) wetting a surface of the high-energy proppant particle with a low-energy surfactant having a surface tension less than the surface energy of the high-energy proppant, thereby resulting in a low-energy proppant particle;
(d) introducing a high-energy surfactant into the subterranean formation having a surface tension greater than the surface energy of the low-energy proppant particle.

The treatment fluid, the low-energy surfactant and the high-energy surfactant can be introduced into the well for use in a fracturing operation using one or more pumps.

The high-energy surfactant may have a surface tension greater than the surface tension of the low-energy surfactant by at least about 5 mJ/m$^2$ (Dyn/cm), about 10 mJ/m$^2$ (Dyn/cm), about 15 mJ/m$^2$ (Dyn/cm) or 20 mJ/m$^2$ (Dyn/cm).

The high-energy surfactant introduced into the subterranean formation has a surface tension greater than 60 mJ/m$^2$ (Dyn/cm). While the low-energy surfactant has a surface tension equal to or less than 59 mJ/m$^2$ (Dyn/cm).

The low-energy surfactant is a surfactant selected from the group consisting of surfactants having a surface tension in the range from about 10 mJ/m$^2$ (Dyn/cm) to about 47 mJ/m$^2$ (Dyn/cm) and/or from about 15 mJ/m$^2$ (Dyn/cm) to about 38 mJ/m$^2$ (Dyn/cm).

Therefore, the present disclosure is well adapted to attain the ends and advantages mentioned, as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present disclosure. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:
1. A method comprising:
(a) providing a low-energy proppant comprising one or more particulate materials and a coating material, which at least partially coats the particulate material and has surface energy in the range of about 15 mJ/m$^2$ Dyn/cm) to about 38 mJ/m (Dyn/cm) to thus produce the low-energy proppant with a lower surface energy than the particulate material while maintaining crush strength of the particulate material, and wherein the coating material is a material selected from the group consisting of Polydimethvlsiloxane PDMS, Polytetrafluoroethylene PTFE, Polytrifluoroethylene P3FEt/PTrFE, Polyhexylmethacrvlate PHMA, Polypropylene-isotactic PP, Polyinylidene fluoride PVD F, Poly (t-butvlmethacrylate) PtBMA, Polychlorotrifluoroethylene PCTrFE, Polyisobutylmethacrylate PIBMA, Polybutylmethacrvlate PBMA, Polytetramethylene oxide PTME, (Polytetrahydrofurane PTHF), Polyisobutylene PIB, Polycarbonate PC, Polyethylene-branched PE, Polyethylene-linear PE, Polyethylmethacrvlate PEMA, Polyvinylacetate PVA, Polyvinyl fluoride PVF, Polyethvlacrylate PEA, Poly-a-methyl styrene PMS, Polyvinyltoluene PVT Polystyrene PS, Polyamide-12 PA-12, Polymethylacrvlate (Polymethacrylic acid) PMAA, Polymethylmethacrylate PMMA, Polyvinylchloride PVC, Polyetheretherketone PEEK, Polyethvleneoxide PEO, Polyethvleneterephthalate PET, Polyvinylidene chloride PVDC, and Polyamide-6.6 PA-66;
(b) producing a treatment fluid comprising the low-energy proppant, an aqueous base fluid and a high-energy surfactant, wherein the treatment fluid has a surface tension greater than the surface energy of the low-energy proppant; and
(c) introducing the treatment fluid into a subterranean formation such that a layer of the low-energy proppant is deposited in at least a section of a fracture in the subterranean formation wherein the lower-surface energy of the low-energy proppant material improves flow behavior of hydrocarbons past the low-energy proppant as compared to flow behavior past the particulate material thereby increasing hydrocarbon production in the subterranean formation.

2. The method of claim 1, wherein the high-energy surfactant has a surface tension greater than the surface energy of the low-energy proppant by at least about 5 mJ/m$^2$ (Dyn/cm).

3. The method of claim 1, wherein prior to step (c), the method comprises:

providing a fracturing fluid comprising an aqueous base fluid and a fracturing surfactant; and introducing the fracturing fluid into the subterranean formation at sufficient pressure to create a fracture in the subterranean formation.

4. The method of claim 1, wherein the low-energy proppant has a surface energy equal to or less than 59 mJ/m$^2$ (Dyn/cm).

5. The method of claim 4, wherein the low-energy proppant has a surface energy in the range from about 10 mJ/m$^2$ (Dyn/cm) to about 47 mJ/m$^2$ (Dyn/cm).

6. A method comprising:
(a) introducing a first treatment fluid, comprising a low-energy proppant, high-energy surfactant and an aqueous base fluid, into a subterranean formation, wherein the low-energy proppant comprises one or more proppant particles at least partially coated with a coating material having a about 15 mJ/m$^2$ (Dyn/cm) to about 38 mJ/m (Dyn/cm) to thus produce the low-energy proppant with a lower surface energy than the particulate material while maintaining crush strength of the particulate material, and wherein the coating material is elected from the group consisting of Polydimethvlsiloxane PDMS, Polytetrafluoroethylene PTFE, Polytrifluoroethylene P3FEt/PTrFE, Polyhexylmethacrvlate PHMA, Polypropylene-isotactic PP, Polyinylidene fluoride PVD F, Poly (t-butvlmethacrylate) PtBMA, Polychlorotrifluoroethylene PCTrFE, Polyisobutylmethacrylate PIBMA, Polybutylmethacrvlate PBMA, Polytetramethylene oxide PTME, (Polytetrahydrofurane PTHF), Polyisobutylene PIB, Polycarbonate PC, Polyethylene-branched PE, Polyethylene-linear PE, Polyethylmethacrvlate PEMA, Polyvinylacetate PVA, Polyvinyl fluoride PVF, Polyethvlacrylate PEA, Poly-a-methyl styrene PMS, Polyvinyltoluene PVT Polystyrene PS, Polyamide-12 PA-12, Polymethylacrvlate (Polymethacrylic acid) PMAA, Polymethylmethacrylate PMMA, Polyvinylchloride PVC, Polyeheretherketone PEEK, Polyethvleneoxide PEO, Polyethvleneterephthalate PET, Polyvinylidene chloride PVDC, and Polyamide-6.6 PA-66, and the coating material provides the low-energy proppant with a surface energy, and wherein the high-energy surfactant provides the first treatment fluid with a surface tension greater than the surface energy of the low-energy proppant;

(b) depositing a layer of the low-energy proppant particle in at least a section of a fracture in the subterranean formation; wherein the lower-surface energy of the low-energy proppant material improves flow behavior of hydrocarbons past the low-energy proppant as compared to flow behavior past the particulate material thereby increasing hydrocarbon production in the subterranean formation; and (c) introducing a second treatment fluid comprising the aqueous base fluid and the high-energy surfactant into the subterranean formation, wherein the second treatment fluid has a surface tension greater than the surface energy of the low-energy proppant particle.

7. The method of claim 6, wherein the first treatment fluid is introduced into a well for use in a fracturing operation using one or more pumps.

8. The method of claim 6, wherein the high-energy surfactant has a surface tension greater than the surface tension of the low-energy proppant by at least about 5 mJ/m$^2$ (Dyn/cm).

9. The method of claim 8, wherein the high-energy surfactant has a surface tension greater than 60 mJ/m$^2$ (Dyn/cm).

10. The method of claim 9, wherein the low-energy proppant has a surface energy equal to or less than 59 mJ/m2 (Dyn/cm).

11. The method of claim 10, wherein the low-energy proppant has a surface energy in the range from about 10 mJ/m$^2$ (Dyn/cm) to about 47 mJ/m$^2$ (Dyn/cm).

12. The method of claim 11, wherein the low-energy proppant has a surface energy in the range from about 15 mJ/m$^2$ (Dyn/cm) to about 38 mJ/m$^2$ (Dyn/cm).

* * * * *